May 12, 1959

G. D. CONLEE 2,886,154

DRIVING CLUTCH FOR WASHING MACHINES

Filed July 3, 1957

Inventor
George D. Conlee
By Carlson, Pitzner, Hubbard & Wolfe
Attorneys

May 12, 1959
G. D. CONLEE
2,886,154
DRIVING CLUTCH FOR WASHING MACHINES
Filed July 3, 1957
3 Sheets-Sheet 2
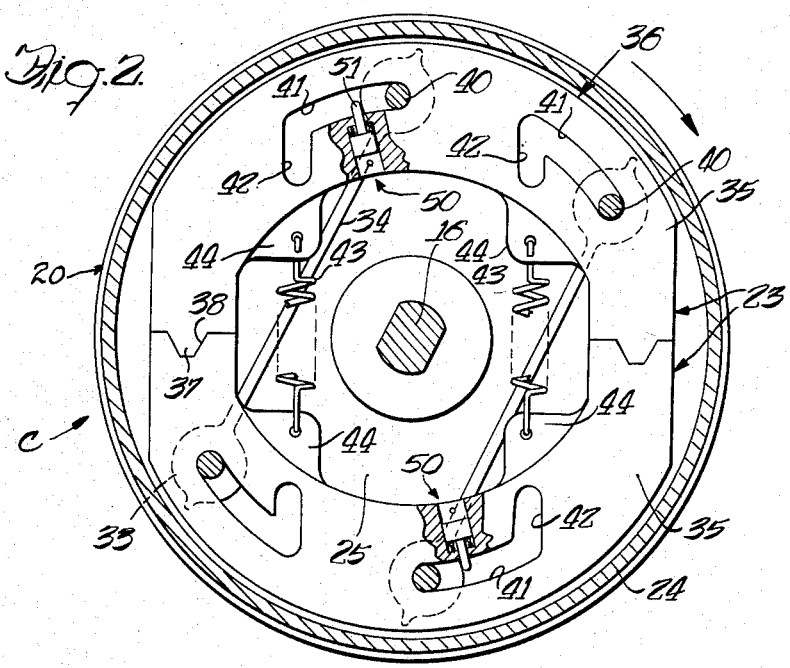
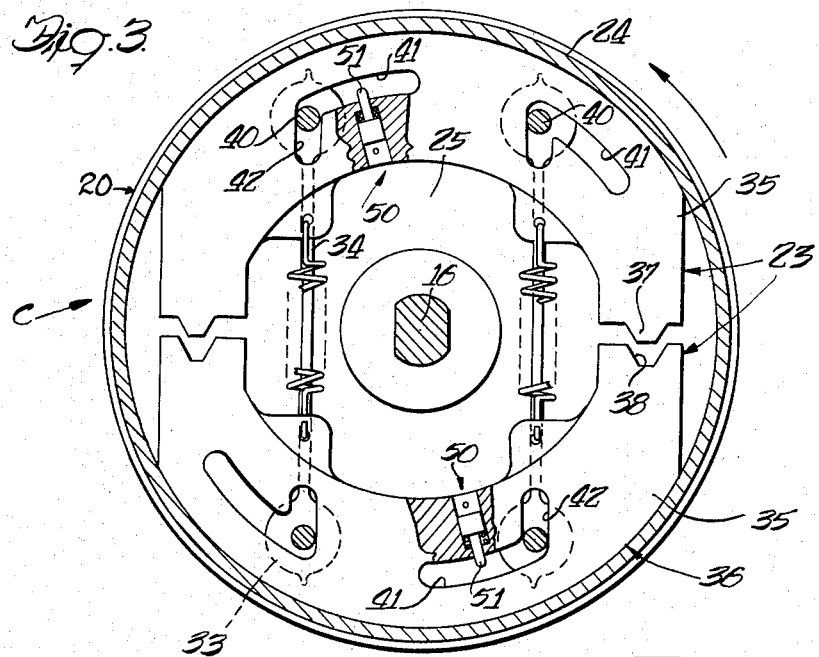
Inventor
George D. Conlee
By Carlson, Pitzner, Hubbard & Wolfe
Attorneys May 12, 1959
G. D. CONLEE
2,886,154
DRIVING CLUTCH FOR WASHING MACHINES
Filed July 3, 1957
3 Sheets-Sheet 3
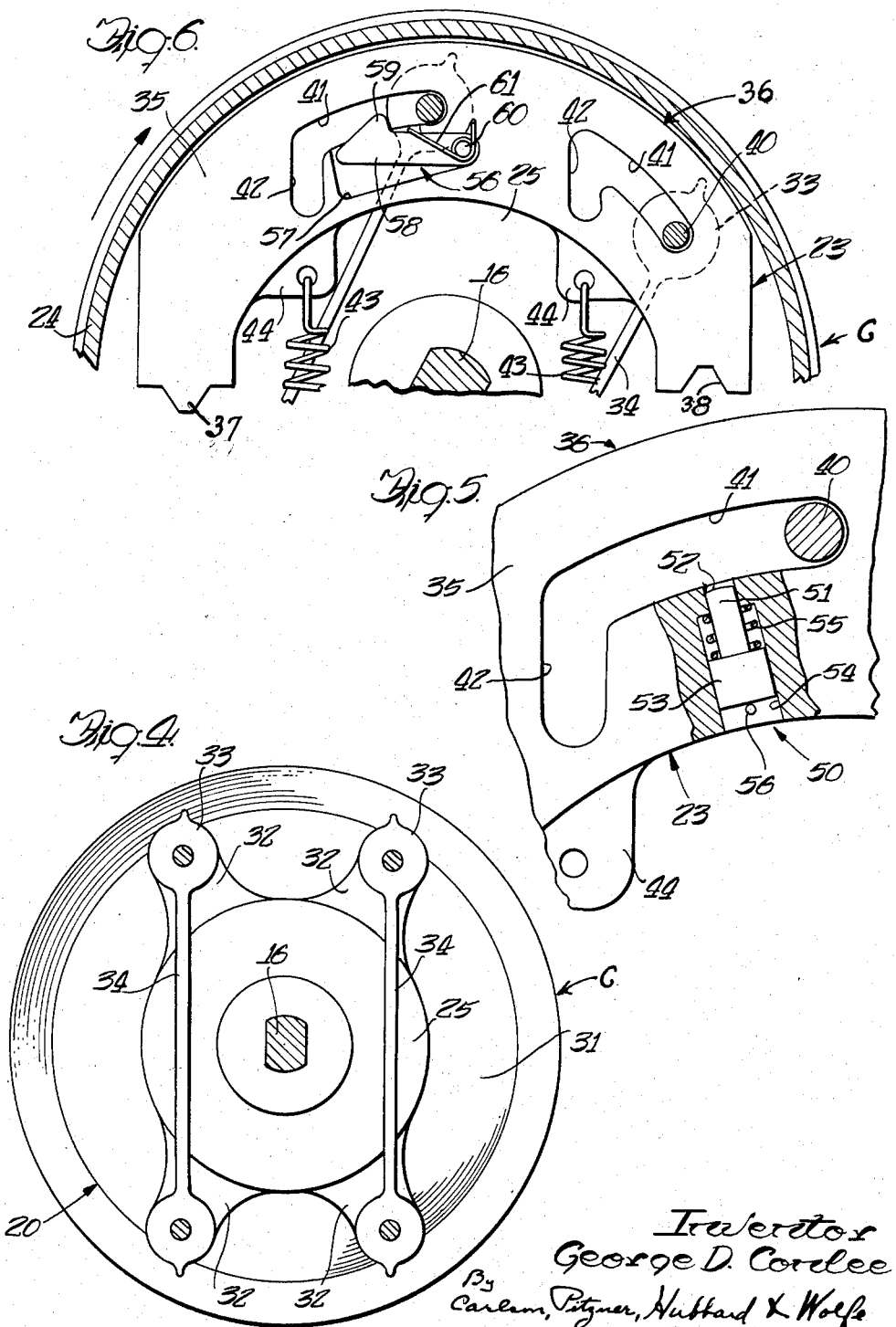
Inventor
George D. Conlee
By
Carlsen, Pitzner, Hubbard & Wolfe
Attorneys

United States Patent Office 2,886,154
Patented May 12, 1959

2,886,154
DRIVING CLUTCH FOR WASHING MACHINES

George D. Conlee, Ripon, Wis., assignor to McGraw-Edison Company, Ripon, Wis., a corporation of Delaware Application July 3, 1957, Serial No. 669,787

7 Claims. (Cl. 192—105)

The invention relates to centrifugal clutches suitable for use in washing machines and it is more particularly concerned with improvements in directionally responsive friction clutches.

One object of the invention is to provide a clutch of the above general character which effectively retains its set driving condition upon a change in the rotative speed of the driving member.

A more specific object is to provide a friction clutch in which the clutch elements are shifted to engaged position by centrifugal force when the driving element is rotated in one direction and latched in a disengaged position when the driving element is rotated in the other direction and embodying novel means for positively retaining the elements in the disengaged position when the speed of the driving element is suddenly reduced.

Other objects and advantages of the invention will become apparent from the following detailed description of the preferred embodiment illustrated in the accompanying drawings in which Figure 1 is a partly sectioned side view of a washing machine equipped with a transmission driven by a clutch embodying the features of the invention.

Fig. 2 is a transverse sectional view through the lower part of the transmission taken in a plane substantially on the line 2—2 of Fig. 1 showing the positions of the clutch elements when the driving element is rotated in a direction for oscillating the agitator.

Fig. 3 is a sectional view similar to Fig. 2 but showing the positions of the clutch elements when the driving element is rotated in a direction for spinning the clothes receptacle.

Fig. 4 is a tarnsverse sectional view taken in a plane substantially on the line 4—4 of Fig. 1, showing the driving element of the clutch in plan.

Fig. 5 is an enlarged fragmentary view of a clutch shoe with parts broken away to shown the latch mechanism in normal rest position.

Fig. 6 is a fragmentary sectional view of the clutch equipped with a modified form of latch mechanism.

Figure 1:
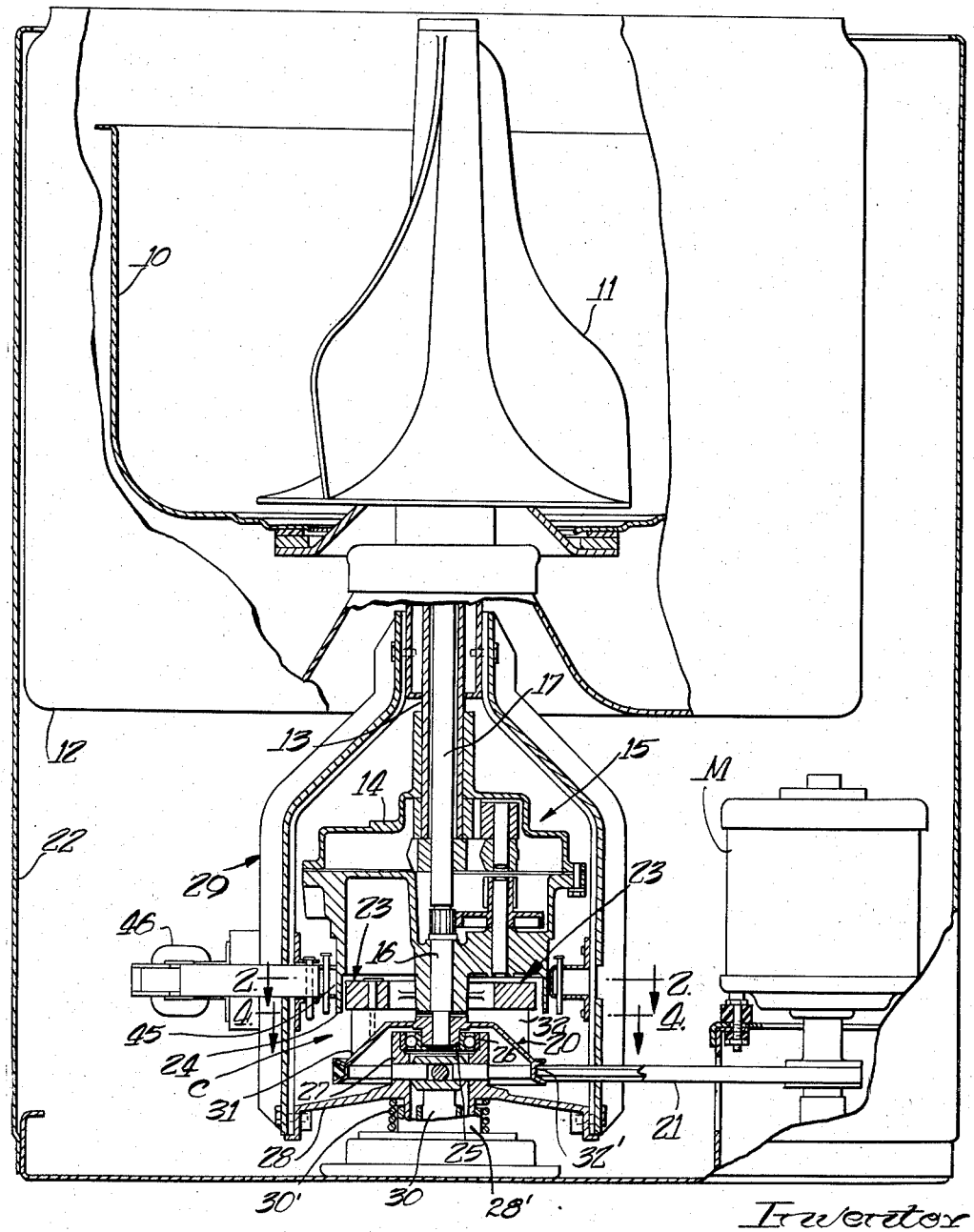

While the invention has been shown and will be described in some detail with reference to a particular embodiment, there is no intention that it be limited to such detail but, on the contrary, the intention is to cover all alternative constructions, modifications and equivalents falling within the spirit and scope of the invention as defined in the appended claims.

For purposes of illustration a clutch C embodying the invention has been shown as incorporated in a washing machine having an upright clothes basket or receptacle 10 in which a load of clothes or other fabrics is washed by oscillation of a multi-bladed agitator 11. Following the washing operation the receptacle is rotated at relatively high speed to extract water from the load of clothes.

In the exemplary machine the receptacle 10 is supported within an outer splash tub 12 upon the upper end of a tubular drive shaft 13. This shaft is nonrotatably fixed at its lower end to a frame structure or casing 14 of a transmission 15. The transmission shown is similar to that disclosed and claimed in my copending application, Serial No. 593,678, filed June 25, 1956, now Patent No. 2,816,450, and includes gearing by which the rotation of an input shaft 16 is enabled to oscillate a shaft 17 for driving the agitator 11. The shaft 17 extends from the transmission 15 through the tubular shaft 13 and has its upper end operatively connected to the actuator in well-known manner.

The clutch C as shown comprises a driving member 20 rotatably driven as by a V-belt 21 from a reversible electric motor M. The motor M is supported at one side of the transmission 15 within a housing 22 which encloses the tub 12 as well as the driving elements of the machine.

In the particular form shown, the driving member 20 carries a plurality, in this instance two, radially movable friction shoes 23 through which a driving connection with a driven clutch member 24 is established when the driving member is rotated in one direction. The driven member, in this instance, is in the form of an integral annular skirt formed on the lower end of the transmission casing 14 and presenting an internal cylindrical friction surface concentric with the shafts 13 and 17.

As will be seen by reference to Figs. 1 and 4 of the drawings, the clutch driving member 20 comprises a hub portion 25 keyed or otherwise nonrotatably fixed to the reduced lower end of the transmission input shaft 16. The hub is rotatably supported in an antifriction thrust bearing 26 seated in a tubular extension 27 of the bottom member 28 of a frame 29 which supports the entire tub assembly of the machine. The extension 27 has a universal joint connection with an upright supporting member 30 which is fixed to an auxiliary upright portion of the frame structure of the washing machine. A coiled compression spring 30' interposed between the bottom member 28 and a friction shoe 28' seated in a thrust bearing on the frame supports a portion of the weight of the assembly.

Formed integrally with the hub 25 is a radially extending frustoconical web 31 having its marginal edge formed to define a circumferential groove 32' for reception of the V-belt 21. Also integral with the hub and web 31 are a series of upstanding shoulder members 32 extending radially outwardly from the hub. The shoulder members have their upper ends disposed in a common horizontal plane and smoothly finished to define flat platforms 33 for slidably supporting the clutch shoes 23.

As shown in Fig. 4 of the drawings, there are two of the platforms 33 at each side of the hub, each pair serving to support one of the shoes 23. Corresponding shoulders of the two pairs are connected by integrally formed ribs 34 having their upper edges flush with the surfaces of the shoulders and forming extensions of the platform for slidably supporting the clutch shoes.

In the exemplary clutch, the shoes 23 are alike. As shown in Figs. 2 and 3, each shoe comprises an arcuate metal body 35 presenting an outer friction surface 36 concentric about the axis of the hub 25. Preferably the abutting ends of the respective shoes are formed with mating tongues 37 and grooves 38 which act to maintain them in proper alinement. As shown in Fig. 2 the shoes are dimensioned so that when retracted with their ends in abutting engagement, the friction surface 36 is spaced inwardly from the friction surface of the driven member 24 and the clutch is disengaged.

The clutch shoes 23 are drivingly coupled with the driving member 20 by pins 40, one of which is anchored in each of the shoulders 32 and extends upwardly perpendicular to the flat surface of the shoulder. These pins engage in suitable openings in the shoes shaped and positioned to enable the pins 40 to control transaxial movements of the shoes, as well as to drive them. Thus, when the driving member is rotated in a clockwise direction the shoes are correspondingly driven and are positively held in a retracted or disengaged position by the pins 40. Upon rotation of the driving member in the opposite or counterclockwise direction, the pins 40 impart rotation to the shoes but the latter are permitted to be moved outwardly by centrifugal force to frictionally engage the driven clutch member 24.

To provide the above mentioned restraining and releasing action, each of the pin openings in the shoes comprises an elongated slot portion 41 arcuate about the axis of the hub 25 and spaced from the hub axis the same distance as the pins 40. Adjacent one end each slot has a inward extension 42 of a depth sufficient to afford clearance for the pin when the shoe moves outwardly into engagement with the driven clutch member. It will be noted that the extensions 42 for the two slots are parallel to each other and oriented to provide clearance for the pins 40 in the movements of the shoes.

Contractile springs 43 connected between integral lugs 44 formed on the respective shoes yieldably urge the shoes inwardly to the disengaged position in which they are shown in Fig. 2. In this position the arcuate slot portions 41 of the pin openings are alined with the pins 40. Accordingly, when the drive member of the clutch is rotated clockwise the pins initially move relative to the shoes until they reach the ends of the slots and then serve to drive the shoes as a unit with the driving member. When thus engaged in the arcuate slots 41, the pins are effective to positively restrain the shoes against the outward movement and the clutch therefore remains disengaged.

When the clutch driving member 20 is rotated in the opposite direction or counterclockwise, the pins 40 engage the ends of the slot adjacent the extensions 42. The shoes 23 are accordingly driven in the same direction as the member 20. Upon reaching a predetermined rotating speed centrifugal force acting on the shoes urges them outwardly against the force exerted by the springs 43 until the shoes frictionally engage the driven member 24 of the clutch. The latter is then rotatably driven.

Clutches of the type above described are particularly suitable for driving washing machines. Thus, when the driving member is rotated counterclockwise the driven member 24 and with it the casing 14 of the transmission are rotated to spin the clothes receptacle 10 for extracting moisture from the load in the receptacle. When rotating clockwise, the clutch drives the input shaft 16 of the transmission and the agitator 11 is oscillated to perform a washing operation. During this phase of the cycle, the casing 15 is held against rotation by a spring biased band brake 45 acting on the outer surface of the driven member 24. A solenoid 46 is provided for releasing the brake when the casing is to be rotated.

To provide for uniform distribution of the load in the receptacle 10 and thus establish a balanced condition before the receptacle is rotated at a high speed, it has been found desirable to operate the drive at a relatively low speed for an interval before spinning takes place. For convenience in effecting this reduced speed drive, it is desirable to utilize a driving motor of the two-speed type. Usually washing and spinning operations are performed with the motor operating in its normal high speed range with a shift to the low speed range for distributing the load in the receptacle. Speed change takes place when the clutch is locked in disengaged position as shown in Fig. 2. When shifted to its low speed range the motor speed diminishes relatively rapidly and the inertia of the driven parts of the washing machine tend to carry the clutch shoes 23 along at their usual speed. Such movements of the shoes may cause the pins 40 to be presented at the ends of their slots in alinement with the extensions 42. This releases the shoes for movement outwardly to engaged position with the result that the clutch is prematurely engaged to drive the receptacle.

In accordance with the invention novel means is provided for effectively preventing such premature clutch engagement incident to a change in the speed of the motor. While this means is shown in the present instance as operating upon a sudden speed reduction, it will be appreciated that it may, if desired, be arranged to operate in response to an increase in motor speed. For this purpose one or both of the clutch shoes 23 is equipped with a centrifugally actuated detent mechanism 50 operative to prevent any change in the engaged or disengaged condition of the clutch as an incident to the change in motor speed. The exemplary clutch has been shown with both shoes equipped with detent mechanism. It will be evident, however, that a single detent mechanism can effectively restrain movement of both shoes due to their interlocking engagement when in retracted position.

In the form shown in Figs. 2, 3 and 5, the detent mechanism 50 comprises a plunger 51 slidable in a radial bore 52 in the body 35 of the clutch shoe opening into the arcuate slot 41 intermediate its ends. Preferably the plunger 51 is guided by an enlarged cylindrical head 53 slidable in a counterbore 54 opening in the inner wall of the shoe concentric with the bore 52 as shown in Fig. 5. A spring 55 interposed between the end of the counterbore and adjacent end of the head urges the plunger to the retracted position defined by a cross pin 56 in the counterbore. In such retracted position, the plunger 51 is completely withdrawn from the slot 41 and the pin 40 can thus move along the slot without interference.

The spring 55 is dimensioned so that it will yield and permit movement of the plunger 51 to move radially into the slot 41 and thus into blocking relation to the pin 40 when the speed of the driven clutch member is well below the lower speed at which the clutch member is driven by the motor M. Accordingly, the plunger takes up its blocking position soon after the driven clutch member starts to rotate and remains in that position to latch the clutch shoes in retracted position regardless of speed changes substantially until the clutch members come to rest. Upon a sudden change of the motor from high speed to low speed, the inertia of the moving parts can only shift the clutch shoes until the detent plunger engages the pin 40. The pin is thus prevented from reaching the end of the slot provided with the radial extension and remains effective to hold the shoes in disengaged position. Premature engagement of the clutch is thus positively prevented.

An alternative form of the detent mechanism 56 operating in the same manner as the mechanism above described is shown in Fig. 6 of the drawings. To accommodate this form of the mechanism, the body 35 of each clutch shoe is formed with an elongated pocket 57 opening laterally adjacent one end to the pin receiving slot 41 of the shoe. An elongated detent finger 58 having a detent nose 59 adjacent one end is pivoted at its other end on a pin 60 within the pocket 57. A torsion spring 61 yieldably urges the finger to a retracted or shoe releasing position but permits its movement by centrifugal force to a latching position. In the latter position in which it is shown in Fig. 6, the nose 59 is presented in the slot 41 in blocking relation to the pin 41, thus positively preventing relative movement of the clutch shoe to a release position upon a sudden decrease in the motor speed.

It will be apparent from the foregoing that the invention provides a direction responsive centrifugal friction clutch of novel and advantageous construction. Rotation of the clutch driving member in one direction disengages the clutch while rotation in the other direction engages it. Through the medium of centrifugally operated detent mechanism provided in one or both of the clutch shoes, any change in the condition of the clutch is prevented as an incident to a sudden change in the motor speed. In other words, the engaged or disengaged condition of the clutch is effectively retained even though the motor speed is suddenly increased or decreased.

I claim as my invention:

1. In a centrifugal clutch having a driving member, a driven member, friction shoes interposed between the driving and driven members, means providing a driving connection between said driving member and said shoes, said connection operating to retain said shoes in disengaged position when the driving member is rotated in one direction and releasing said shoes for movement by centrifugal force to engaged position upon rotation of the driving member in the other direction, and centrifugally actuated latch means mounted on and rotatable with one of said shoes operable to prevent interruption of the retaining action of said driving means when the speed of the driving member is suddenly reduced while rotating in said one direction.

2. In a centrifugal clutch having a rotatable driving member and a driven member, friction shoes interposed between said members, coacting means on the driving member and the shoes providing a driving connection with the shoes, said coacting means permitting relative rotation of the shoes and driving member between two positions, said means in one of said positions acting to maintain the shoes disengaged from the driven clutch member and in the other position releasing the shoes for movement to engaged positions by centrifugal force, and latch means carried by one of said shoes operable by centrifugal force to prevent relative rotation of the driving member and shoes to said other position while the driving member is rotating.

3. In a centrifugal clutch, in combination, a rotatable driving member, a driven member, friction shoes supported on said driving member for rotational movement relative to the driving member and for radial movement into driving engagement with the driven member, means drivingly connecting said driving member with said shoes, said connecting means permitting relative rotational movement of the shoes and driving member between a position in which the shoes are held against radial movement and a position in which they are released for radial movement, and a latch element mounted on and rotatable with one of said shoes operable by centrifugal force into position to block the relative movements of the shoes from one position to the other upon a change in the rotative speed of the driven member.

4. In a centrifugal clutch, in combination, a rotatable driving member, a driven member, friction shoes supported on said driving member for rotational movement relative to the driving member and for radial movement into driving engagement with the driven member, each of said shoes having a pair of elongated slots arcuate about the axis of said driving member, said slots each having an inward extension adjacent their corresponding ends, a pair of pins carried by said driving member positioned to engage in the respective slots, said pins engaging one end or the other of the slots to rotatably drive the shoes when the driving member is rotated in one direction or the other, the extensions of said slots being dimensioned to accommodate the pins to permit outward movement of the shoe by centrifugal force to engaged position, said pins when engaging the other ends of the slots positively restraining movement of the shoes to engaged position, and latch means carried by at least one of said shoes including a stop element movable into one of the slots in that shoe by centrifugal force for blocking the pin against movement in the slot upon a sudden reduction in the speed of the driving member.

5. A clutch as defined in claim 4 in which the stop element comprises a plunger slidable in a bore in the clutch shoe and yieldably urged by a spring to a retracted position.

6. A clutch as defined in claim 4 in which the stop element comprises a latch finger pivoted to the shoe and biased to a retracted position by a spring adapted to permit the finger to swing into the pin receiving slot when the clutch driving member is rotated.

7. A friction shoe for a directionally responsive clutch comprising an arcuate metal body presenting a friction surface on its outer face, said body having elongated slots adjacent opposite ends arcuate about the same center as said friction surface, said body having a bore radially disposed with respect to the friction surface and opening at one end into one of said slots, a plunger slidable in said bore into and out of said slot, and a spring yieldably urging the plunger out of the slot, said spring yielding to permit movement of the plunger into the slot when the shoe is subjected to a predetermined centrifugal force.

References Cited in the file of this patent

UNITED STATES PATENTS

| 2,018,101 | Swennes et al. | Oct. 22, 1935 |
| 2,762,483 | Clark | Sept. 11, 1956 |
| 2,791,309 | Couse | May 7, 1957 |

FOREIGN PATENTS

| 296,316 | Great Britain | Nov. 27, 1929 |